Patented Aug. 7, 1945

2,381,063

UNITED STATES PATENT OFFICE 2,381,063

VULCANIZING AGENT

Frederick E. Küng, Akron, Ohio, assignor to The B. F. Goodrich Company, New York, N. Y., a corporation of New York No Drawing. Application May 7, 1942, Serial No. 442,085

1 Claim. (Cl. 260—83)

This invention relates to a method for vulcanizing polymeric materials which comprises treating the polymer with a reagent which forms bridges or cross-links between the polymer molecules. This linkage is accomplished by reacting a group containing an active hydrogen atom with one of the following groups: cyanide (nitrile), isocyanide (isonitrile), isocyanate, thiocyanate, and isothiocyanate. The active hydrogen may be in the polymer, and the nitrile or similar group in the cross-linking molecule, or vice versa. However, the active hydrogen and the other reacting group cannot both be present in the same molecule. Each cross-linking molecule and each molecule of polymer should contain at least two reactive groups, although more than two may be present.

There are many so-called "synthetic resins" which have achieved wide-spread commercial use within the past few years. These materials, in general, are polymers of varying lengths and structures, but many of them consist very largely of long polymer chains which are unconnected by cross-linkages or bridges. Polymers having this structure are thermoplastic—that is, when heated, they become soft and plastic, regaining their pristine hardness when cooled again. Natural rubber is also a polymer of this sort. This property is of great importance in that it makes possible the molding and extruding of these materials into desired shapes while hot without the necessity for extensive machining or cutting. This property is disadvantageous, however, in that the articles made from such thermoplastic resins cannot be used at elevated temperatures. These polymers are also usually soluble in various solvents.

I have now discovered a process for reducing or eliminating the thermoplasticity and solubility of certain synthetic resins by treatment with agents which I term vulcanizing agents because of the analogy of their effect upon these polymers to the effect of sulfur upon natural rubber. It is believed that these new vulcanizing agents form bridges or cross-links between the long polymer molecules, by reaction of the molecules of the vulcanizing agent with two molecules of polymer. The precise physical properties which can be obtained by treating polymers with my new vulcanizing agents depend upon the number and length of cross-linkages formed. The length of the cross-linkage may be controlled by controlling the length of the molecule of vulcanizing agent between the active groups. The number of cross-linkages may be controlled either by controlling the number of reactive groups in the polymer molecule or by controlling the amount of my new vulcanizing agent to be used.

As has been pointed out above, the group containing the active hydrogen may be either in the polymer or in the cross-linking molecule. I shall first describe the situation where the active hydrogen is in the polymer, and the vulcanizing agents are organic compounds to which are attached two or more groups containing an unsaturated carbon-nitrogen linkage and which react with a group containing an active hydrogen to form an addition product; such nitrogen-containing groups are the following: cyanide (nitrile), isocyanide (isonitrile), isocyanate, thiocyanate, or isothiocyanate. The compounds should not contain, however, other groups (e. g. groups containing an active hydrogen atom) which will react with these to prevent reaction of the vulcanizing agent with the desired polymers. Although compounds having a very short chain, for example, ethylene diisocyanate, may be used, it is preferred to employ compounds having a higher molecular weight because of their decreased volatility. Among the compounds which I have found to have valuable vulcanizing, or cross-linking properties are alkylene diisocyanates such as trimethylene diisocyanate, tetramethylene diisocyanate, pentamethylene diisocyanate, hexamethylene diisocyanate, heptamethylene diisocyanate, octamethylene diisocyanate, nonamethylene diisocyanate, decamethylene diisocyanate, and their homologues. The corresponding compounds in which nitrile, isonitrile, thiocyanate, or isothiocyanate groups replace the isocyanate groups also may be used. Similar compounds containing two different active groups may be used, such as octane-1-isocyanate-8-nitrile or the like. The hydrocarbon chain connecting the active groups may contain unsaturated linkages, as for example in 3-heptenediisocyanate-1,4; 2,5-octadienediisocyanate-1,7; and other similar compounds, including those in which the isocyanate groups are replaced with nitrile, isonitrile, thiocyanate, or isothiocyanate groups. The chain of atoms connecting the active groups may be straight or branched and may contain aromatic nuclei. Examples of this class are propanediisocyanate-1,2; butanediisocyanate-1,2; pentanediisocyanate-1,2; pentanediisocyanate - 1,3; hexanediisocyanate - 1,2; hexanediisocyanate-1,3; hexanediisocyanate-1,4; hexanediisocyanate-1,5; 4-methyl-hexanediisocyanate-1,2; 3-ethyl-hexanediisocyanate-1,4; 1-phenylethanediisocyanate - 1,2; 2 benzyl - propanediisocyanate-1,3; 2,4-diphenylhexanediisocyanate-1,6; p-phenylene diisocyanate; m-phenylene diisocyanate; 4,4'-diphenyl diisocyanate; 1,4-naphthalene diisocyanate; 1,5-naphthalene diisocyanate; 1,8-naphthalene diisocyanate; 2,6-naphthalene diisocyanate; and the homologues and analogues of these compounds. Compounds similar to the aforementioned but containing nitrile, isonitrile, thiocyanate, or isothiocyanate groups may also be used as vulcanizing agents.

The part of the molecule connecting the two active groups need not consist entirely of carbon and hydrogen, but may contain other groups such as halogen, oxygen in the form of an ether linkage, sulfur as a thioether, tertiary amino groups, sulfone linkages, and any other groups which do not contain or do not induce in the molecule any active hydrogen atoms. Typical examples of such compounds are: 2-chloro-propane-diisocyanate-1,3; 3-bromo-butanediisocyanate-1,4; 4,4'-diisocyanatediphenyl sulfone; 4,4'-diisocyanatediphenyl ether; 2,2'-diisocyanate diethyl ether; 2,2'-diisocyanate diethyl sulfide; 3-(dimethylamino) pentane-diisocyanate-1,5; 2-(p-N,N-dimethylanilino) propanediisocyanate-1,3; and similar compounds containing either isocyanate, isonitrile, nitrile, thiocyanate, or isothiocyanate groups.

My new vulcanizing agents containing two of the active groups as described above may be prepared by the same methods used for compounds containing one active group, which are well known in the art. For example, the diisocyanate compounds may be prepared by treating the hydrochloride of a diamine with phosgene and heating the resulting product to eliminate hydrochloric acid, as follows:

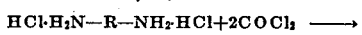

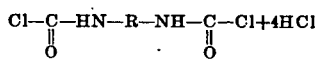

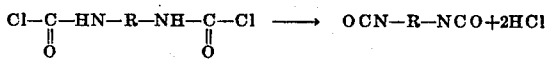

These compounds may also be produced by treating the ester or the acid chloride of a dicarboxylic acid with hydrazine to form the dihydrazide,

treating the resulting dihydrazide with nitrous acid to form the diazide,

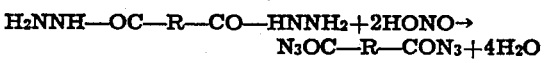

and warming the azide to form the isocyanate

The thiocyanates may be prepared by treating an alkyl dihalide with potassium thiocyanate:

The isothiocyanates may readily be prepared by the rearrangement of the normal thiocyanates by heating the latter to a high temperature, or by the action of sulfur on the isonitriles.

The isonitriles may be prepared by the interaction of a dihalide with silver cyanide:

The normal nitriles, on the other hand, may be prepared by the action of potassium cyanide on a dihalide:

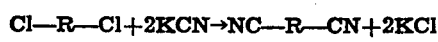

The polymers which may be successfully vulcanized or cross-linked with my new agents include all those polymers having at least two hydrogen atoms per molecule active enough to react with my vulcanizing agents. Such hydrogens are found in hydroxyl, carboxyl, amino, amido, and similar groups; hence any polymer containing these groups or containing any active hydrogen at least as active as hydroxyl hydrogen, may be vulcanized with my new agents. Among the commercially important polymers which may be treated by my method are cellulose; partial esters or ethers of cellulose; proteins such as casein, zein, gelatine and the like; polyvinyl alcohol; partially hydrolyzed polyvinyl esters such as the products obtained by mild hydrolysis of polyvinyl acetate, propionate, or butyrate; partial polyvinyl acetals which contain hydroxyl groups; polyamides, such as polyacrylamide or polymethacrylamide; natural rubber; polyvinyl phenol; polyvinyl carbazole; polyvinyl glycollate; polyacrylic acid; partially hydrolyzed polyacrylic esters; polymers made by reacting dicarboxylic acids with diamines; polymerized glycol monoacrylate; and other similar compounds. Copolymers or mixed polymers made from mixtures of copolymerizable monomers may also be used provided that at least one of the monomers contains active hydrogen, as for example copolymers of ethyl acrylate and methacrylamide, or glycol monoacrylate and styrene. Thus polystyrene, which is ordinarily unvulcanizable, may be vulcanized by the method of this invention if a small amount of glycol monoacrylate, for example, is copolymerized with the styrene.

As pointed out previously, the cross-linking molecule or vulcanizing agent may contain the active hydrogen atom, and the polymer molecule may contain the nitrile, isonitrile, isocyanate, thiocyanate, or isothiocyanate group. Vulcanizing agents of this sort comprise such compounds as ethylene glycol; 1,3-propanediol; 1,3-butanediol; 1,4-butanediol; diethylene glycol; triethylene glycol; cellulose; sugar; starch; malonic acid; succinic acid; glutaric acid; adipic acid; pimelic acid; lactic acid; tartaric acid; mono- or diamides of any of the foregoing acids; ethylene diamine; 1,3-propanediamine; 1,3-butanediamine; 1,4-butanediamine; hydroquinone; resorcinol; 2,2'-dihydroxydiphenyl; 2,4'-dihydroxydiphenyl; 4,4'-dihydroxydiphenyl; 1,4-dihydroxynaphthalene; 1,6-dihydroxynaphthalene; the compounds analogous to the foregoing aromatic hydroxy compounds in which one or more of the hydroxy groups has been replaced by an amino or carboxylic acid group; and other similar compounds.

The cross-linking molecule, or vulcanizing agent, whether it contain active-hydrogen groups or nitrogen-containing groups, must contain at least two of these groups; however, more than two groups may be present in each molecule if desired, thus producing a greater amount of cross-linking per unit of vulcanizing agent.

As a specific example of my process for vulcanizing polymeric materials, I describe the vulcanization of a copolymer of glycol mono-acrylate and styrene with octamethylene diisocyanate.

A mixture of about 5 parts by weight of glycol monoacrylate, about 50 parts by weight of styrene, and about ½ part by weight of benzoyl peroxide were allowed to stand at room temperature for twenty days in a sealed glass-lined vessel. The product, after removal of a small amount of unpolymerized styrene by milling on an open roll mill, was a soft, thermoplastic solid, soluble in benzene, chloroform and acetone.

One part by weight of octamethylene diisocyanate was mixed with about 25 parts of the polymer on a roll mill at room temperature, and the resulting mixture was heated in a mold for 15 minutes at 260° F. The product was non-thermoplastic, and practically insoluble in benzene, chloroform, or acetone.

About 10 parts by weight of the uncured polymer and one part of octamethylene diisocyanate were dissolved in about 100 parts of benzene. When this solution was applied to a surface in the form of a thin film, dried, and heated, an excellent paint film was obtained which was resistant to acetone and benzene.

When the foregoing solution was allowed to stand for five days at room temperature, it set to a very stiff gel.

My new vulcanization process may be used with the pure polymers, or may be used with mixtures of the polymers with other materials such as plasticizers, softeners, pigments, fillers, stabilizers, solvents, and the like. Although the vulcanization process may be carried out at any temperature, it is preferred to use temperatures of about 50° C. to about 150° C. However, the temperature varies with the particular polymer and vulcanizing agent used.

Since the reaction between the active groups which I have specified—i. e., groups containing an active hydrogen and such groups as nitrile, isonitrile, isocyanate, thiocyanate, and isothiocyanate—is an addition reaction which produces no by-products, the reaction is particularly suitable for a vulcanization process in that it avoids introducing undesirable impurities into the polymer.

Although I have herein described specific embodiments of my invention, I do not intend to limit myself solely thereto, but only to the extent defined by the appended claim.

I claim:

The process of vulcanizing polymerized glycol monoacrylate which comprises dispersing therein octamethylene diisocyanate.

FREDERICK E. KÜNG.